United States Patent
Schofield et al.

(10) Patent No.: US 9,129,253 B2
(45) Date of Patent: Sep. 8, 2015

(54) WORKFLOW LOCKED LOOPS TO ENABLE ADAPTIVE NETWORKS TO CHANGE A POLICY STATEMENT RESPONSIVE TO MISSION LEVEL EXCEPTIONS AND RECONFIGURE THE SOFTWARE-CONTROLLABLE NETWORK RESPONSIVE TO NETWORK LEVEL EXCEPTIONS

(75) Inventors: Bruce Schofield, Tyngsboro, MA (US); Franco Travostino, Arlington, MA (US)

(73) Assignee: RPX Clearinghouse LLC, San Francisco, CA (US)

(*) Notice: Subject to any disclaimer, the term of this patent is extended or adjusted under 35 U.S.C. 154(b) by 2743 days.

(21) Appl. No.: 11/469,422

(22) Filed: Aug. 31, 2006

(65) Prior Publication Data
US 2008/0034069 A1 Feb. 7, 2008

Related U.S. Application Data

(60) Provisional application No. 60/721,757, filed on Sep. 29, 2005.

(51) Int. Cl.
*G06F 11/00* (2006.01)
*G06F 15/173* (2006.01)
*G06F 15/177* (2006.01)
*G06Q 10/10* (2012.01)
(Continued)

(52) U.S. Cl.
CPC ............ *G06Q 10/10* (2013.01); *H04L 41/0681* (2013.01); *H04L 43/026* (2013.01); *H04L 67/12* (2013.01); *H04W 84/18* (2013.01); *H04L 41/0893* (2013.01)

(58) Field of Classification Search
CPC G06Q 10/10; H04L 41/0893; H04L 41/0681; H04L 43/026; H04L 67/12; H04W 84/18
USPC .............. 709/226, 221, 222, 224; 714/4.1, 26
See application file for complete search history.

(56) References Cited

U.S. PATENT DOCUMENTS 5,889,953 A * 3/1999 Thebaut et al. ................ 709/221
6,212,649 B1 * 4/2001 Yalowitz et al. ................ 714/31
(Continued)

FOREIGN PATENT DOCUMENTS

WO WO 03/036899 A2 * 5/2003 .............. H04L 29/00

OTHER PUBLICATIONS

Camorlinga, et al., Modeling of Workflow-Engaged Networks on Radiology Transfers Across a Metro Network, IEEE Transactions on Information Technology in Biomedicine, vol. 10, No. 2, Apr. 2006. pp. 275-281.
(Continued)

*Primary Examiner* — Daniel C Murray
(74) *Attorney, Agent, or Firm* — Christopher & Weisberg, P.A.

(57) ABSTRACT

A closed loop system is described for enhanced adaptive network capabilities in support of workflow missions. Multiple workflow-locked loops with different sampling rates are employed. A faster, lower loop is employed to gather data from the field and deal with network level exceptions such as faults, fades, and changing conditions. A slower, upper loop is employed to handle mission level exceptions. The result is a system capable of integrating management of multiple workflow missions, including reallocation of resources in response to changes in mission goal statements and network resource availability.

16 Claims, 2 Drawing Sheets

(51) Int. Cl.
*H04L 12/26* (2006.01)
*H04L 29/08* (2006.01)
*H04L 12/24* (2006.01)
*H04W 84/18* (2009.01)

(56) References Cited

U.S. PATENT DOCUMENTS

| | | | | |
|---|---|---|---|---|
| 6,446,123 | B1* | 9/2002 | Ballantine et al. | 709/224 |
| 6,542,075 | B2* | 4/2003 | Barker et al. | 340/506 |
| 6,578,076 | B1* | 6/2003 | Putzolu | 709/223 |
| 6,694,362 | B1* | 2/2004 | Secor et al. | 709/223 |
| 6,720,990 | B1* | 4/2004 | Walker et al. | 348/143 |
| 6,771,661 | B1* | 8/2004 | Chawla et al. | 370/468 |
| 6,856,942 | B2* | 2/2005 | Garnett et al. | 702/183 |
| 6,909,695 | B2* | 6/2005 | Lee et al. | 370/238 |
| 6,912,574 | B2* | 6/2005 | Scifres et al. | 709/224 |
| 6,990,518 | B1* | 1/2006 | Secor | 709/223 |
| 7,055,052 | B2* | 5/2006 | Chalasani et al. | 714/4 |
| 7,058,712 | B1* | 6/2006 | Vasko et al. | 709/224 |
| 7,113,990 | B2* | 9/2006 | Scifres et al. | 709/224 |
| 7,194,445 | B2* | 3/2007 | Chan et al. | 706/20 |
| 7,210,073 | B1* | 4/2007 | Landwehr et al. | 714/47 |
| 7,228,429 | B2* | 6/2007 | Monroe | 713/182 |
| 7,260,743 | B2* | 8/2007 | Fellenstein et al. | 714/26 |
| 7,340,654 | B2* | 3/2008 | Bigagli et al. | 714/47.2 |
| 7,363,195 | B2* | 4/2008 | Yetter et al. | 702/183 |
| 7,490,095 | B2* | 2/2009 | Labadie et al. | 1/1 |
| 7,502,854 | B2* | 3/2009 | Luo et al. | 709/224 |
| 7,525,421 | B2* | 4/2009 | Levesque et al. | 340/517 |
| 7,526,541 | B2* | 4/2009 | Roese et al. | 709/223 |
| 7,539,739 | B2* | 5/2009 | Murakami et al. | 709/220 |
| 7,555,528 | B2* | 6/2009 | Rezvani et al. | 709/217 |
| 7,617,304 | B2* | 11/2009 | Devarakonda et al. | 709/223 |
| 7,634,361 | B2* | 12/2009 | Levesque et al. | 702/19 |
| 7,636,919 | B2* | 12/2009 | Choudhary et al. | 719/318 |
| 7,644,006 | B2* | 1/2010 | Casati et al. | 705/7 |
| 7,739,372 | B2* | 6/2010 | Roese et al. | 709/223 |
| 7,752,287 | B2* | 7/2010 | Routray et al. | 709/220 |
| 7,788,534 | B2* | 8/2010 | Akiyama et al. | 714/26 |
| 7,814,404 | B2* | 10/2010 | Shenfield | 715/200 |
| 7,840,856 | B2* | 11/2010 | Apte et al. | 714/48 |
| 7,840,857 | B2* | 11/2010 | Breiter et al. | 714/48 |
| 7,843,822 | B1* | 11/2010 | Paul et al. | 370/230 |
| 7,859,396 | B2* | 12/2010 | Monroe | 340/506 |
| 7,996,353 | B2* | 8/2011 | Chan et al. | 706/48 |
| 8,055,607 | B2* | 11/2011 | Chan et al. | 706/62 |
| 8,279,874 | B1* | 10/2012 | Lu et al. | 370/395.2 |
| 8,296,412 | B2* | 10/2012 | Secor et al. | 709/224 |
| 2002/0178252 | A1* | 11/2002 | Balabhadrapatruni et al. | 709/223 |
| 2003/0115204 | A1* | 6/2003 | Greenblatt et al. | 707/10 |
| 2003/0225905 | A1* | 12/2003 | Scifres et al. | 709/234 |
| 2003/0235158 | A1* | 12/2003 | Lee et al. | 370/256 |
| 2003/0236689 | A1* | 12/2003 | Casati et al. | 705/7 |
| 2004/0015599 | A1* | 1/2004 | Trinh et al. | 709/232 |
| 2004/0059966 | A1* | 3/2004 | Chan et al. | 714/48 |
| 2004/0103195 | A1* | 5/2004 | Chalasani et al. | 709/226 |
| 2004/0103339 | A1* | 5/2004 | Chalasani et al. | 714/4 |
| 2004/0122950 | A1* | 6/2004 | Morgan et al. | 709/226 |
| 2004/0131226 | A1* | 7/2004 | Poolla | 382/100 |
| 2004/0236845 | A1* | 11/2004 | Murakami et al. | 709/222 |
| 2004/0243692 | A1* | 12/2004 | Arnold et al. | 709/220 |
| 2004/0243699 | A1* | 12/2004 | Koclanes et al. | 709/224 |
| 2004/0267865 | A1* | 12/2004 | Cuervo | 709/200 |
| 2005/0027837 | A1* | 2/2005 | Roese et al. | 709/223 |
| 2005/0027845 | A1* | 2/2005 | Secor et al. | 709/223 |
| 2005/0091356 | A1* | 4/2005 | Izzo | 709/223 |
| 2006/0048142 | A1* | 3/2006 | Roese et al. | 717/176 |
| 2006/0075093 | A1* | 4/2006 | Frattura et al. | 709/224 |
| 2006/0092861 | A1* | 5/2006 | Corday et al. | 370/256 |
| 2006/0117113 | A1* | 6/2006 | Elliott et al. | 709/239 |
| 2006/0236061 | A1* | 10/2006 | Koclanes | 711/170 |
| 2007/0067452 | A1* | 3/2007 | Fung et al. | 709/224 |
| 2007/0106541 | A1* | 5/2007 | Raisanen | 705/7 |
| 2007/0131822 | A1* | 6/2007 | Stallard | 244/190 |
| 2007/0150565 | A1* | 6/2007 | Ayyagari et al. | 709/223 |
| 2007/0268516 | A1* | 11/2007 | Bugwadia et al. | 358/1.15 |
| 2008/0034080 | A1* | 2/2008 | Chamaraj et al. | 709/223 |
| 2008/0133982 | A1* | 6/2008 | Rawlins et al. | 714/699 |
| 2010/0023604 | A1* | 1/2010 | Verma et al. | 709/221 |
| 2010/0094981 | A1* | 4/2010 | Cordray et al. | 709/222 |

OTHER PUBLICATIONS

Lavian, et al., DWDM-RAM: A Data Intensive Gird Service Architecture Enabled by Dynamic Optical Networks, 2004 IEEE International Symposium on Cluster Computing and the Grid, pp. 762-764.

Lavian, et al., An Extensible, Programmable, Commercial-Grade Platform for Internet Service Architecture, IEEE Transactions on Systems, Man, and Cybernetics—Part C: Applications and Reviews, vol. 34, No. 1, Feb. 2004, pp. 58-68.

Hollingsworth, Workflow Management Coalition, The Workflow Reference Model, Jan. 19, 1995, pp. 1-68.

The Workflow Management Coalition, Workflow Management Coalition Workflow Standard Workflow Process Definition, Oct. 25, 2002, Version 1.0, pp. 1-114.

Hayes, et al., Workflow Interoperabiltiy Standards for the Internet, IEEE Internet Computing, May. Jun. 2000, pp. 37-45.

Hagen, et al., Exception Handling in Workflow Management Systems, IEEE Transactions on Software Engineering, vol. 26, No. 10, Oct. 2000, pp. 943-958.

Cao, et al., GridFlow: Workflow Management for Grid Computing, Proceedings of the 3rd IEEE/ACM Internation Symposium on Cluster Computing and the Grid, 2003, pp. 1-8.

Deelman, et al., Mapping Abstract Complex Workflows onto Grid Environments, Journal of Grid Computing, 2003, pp. 25-39.

Simeonidou, et al., Optical Network Infrastructure for Grid, Global Grid Forum 2002, pp. 1-55.

Von Laszewski, et al., GridAnt: A Client-Controllable Grid Workflow System., Argonne National Laboratory Preprint ANL/MCS-P1098-1003, Jan. 2004, pp. 1-10.

Arnaud, et al., Customer Controlled and Managed Optical Networks, Jan. 15, 2003, pp. 1-11.

Mambretti , et al., The Photonic TeraStream: enabling next generation applications through intelligent optical networking at iGRID2002, Elsevier Science B.V, 2003, pp. 897-908.

* cited by examiner

WORKFLOW LOCKED LOOPS TO ENABLE ADAPTIVE NETWORKS TO CHANGE A POLICY STATEMENT RESPONSIVE TO MISSION LEVEL EXCEPTIONS AND RECONFIGURE THE SOFTWARE-CONTROLLABLE NETWORK RESPONSIVE TO NETWORK LEVEL EXCEPTIONS

CROSS-REFERENCE TO RELATED APPLICATIONS

A claim of priority is made to U.S. Provisional Patent Application 60/721,757, filed Sep. 29, 2005, entitled MISSION-GRADE WORKFLOWS, which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract No. HR0011-05-c-0120 awarded by DARPA/CMO.

BACKGROUND OF THE INVENTION

Workflow missions are utilized to counter threats such as criminal and terrorist activity. A workflow mission includes multiple instances of an application or types of applications working towards a common set of goals. In a typical workflow mission a collection of sensors, often of different types, provides raw data to computing resources. The computing resources process the raw data to produce a result which is more useful to human beings or other applications. Unless the sensors have large memory capacity to store data, and the raw data is manually retrieved, a communication network transports data and commands between devices.

Allocation of network resources to support workflow mission is a complex, manual process that requires technical expertise. The process is similar to network planning in the telecommunications field, where subject matter experts determine resource requirements and plan an appropriate deployment of those resources by mental estimate, manual calculation, or a combination of both. However, unlike planning a telecommunications network, planning a workflow mission may be acutely time-constrained, have greater risks associated with failure, and be in competition with other missions for scarce resource. Further complicating matters, a workflow mission is more likely to be subjected to dynamically changing conditions and requirements due to, for example, reduced offered load due to moisture, smoke, interference temperature, and jamming. A failure in resource allocation planning or a failure to adapt to changing conditions during a mission can manifest itself as missed targets resulting in cascading of risks, poor reaction to a mission's evolving circumstances, under- or mis-utilization of key resources, and performance degradation or partial failures which go unnoticed until a more complete failure occurs.

SUMMARY OF THE INVENTION

In accordance with one embodiment of the invention, apparatus for facilitating adaptation of at least one software-controllable communications network comprises: a translation module operative to translate at least one mission goal statement to a policy statement; a controller operative in response to the policy statement to configure the software-controllable network; a first workflow-locked loop between the translation module and the controller for processing mission level exceptions; and a second workflow-locked loop between the controller and the software-controllable network for processing network level exceptions.

In accordance with another embodiment of the invention, a method for facilitating adaptation of at least one software-controllable communications network comprises the steps of: translating, with a translation module, at least one mission goal statement to a policy statement; in response to the policy statement, configuring the software-controllable network with a controller; processing mission level exceptions via a first workflow-locked loop between the translation module and the controller; and processing network level exceptions via a second workflow-locked loop between the controller and the software-controllable network.

DETAILED DESCRIPTION

Figure 1:
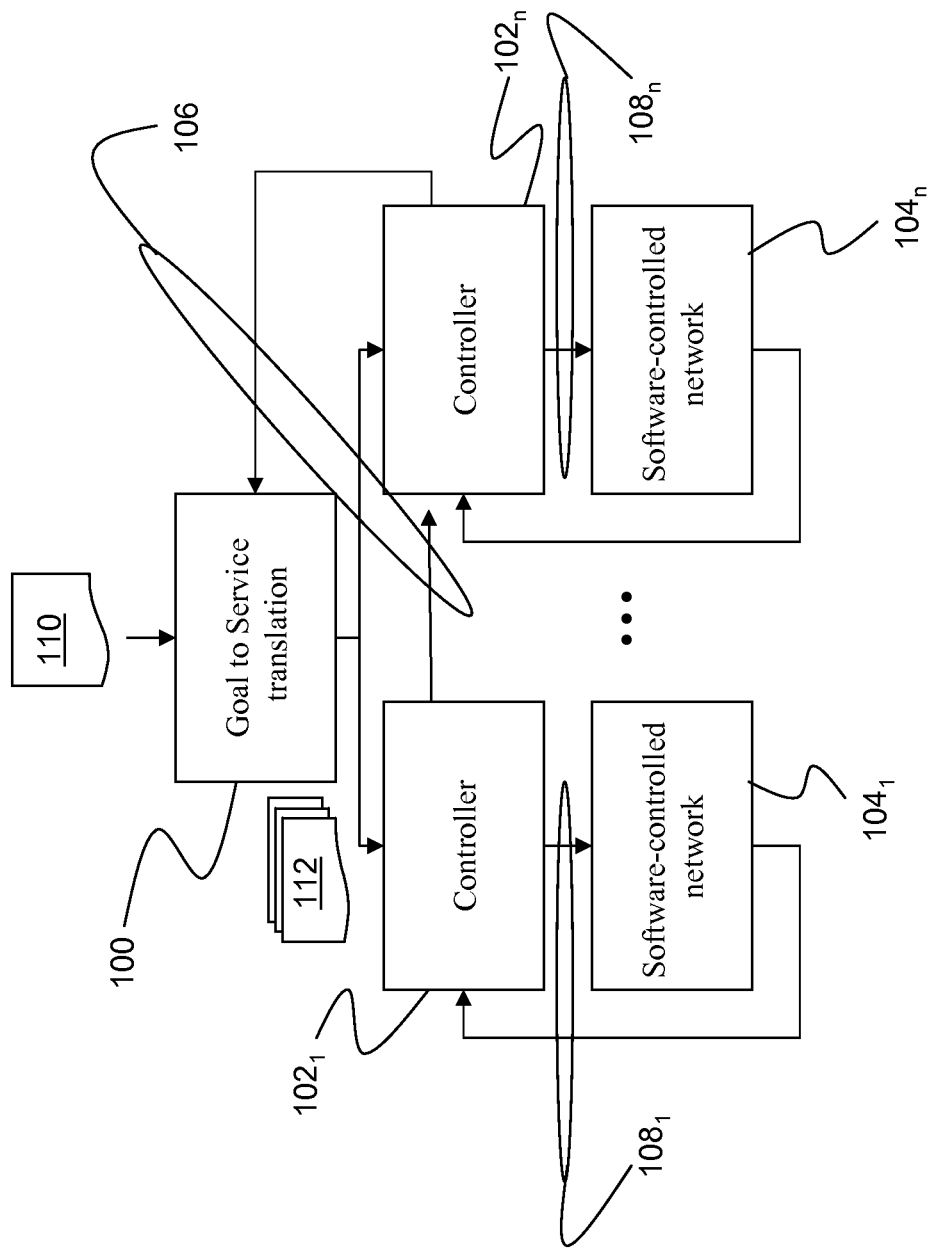
FIG. 1 is a block diagram of a scaled workflow-locked loop.
Figure 2:
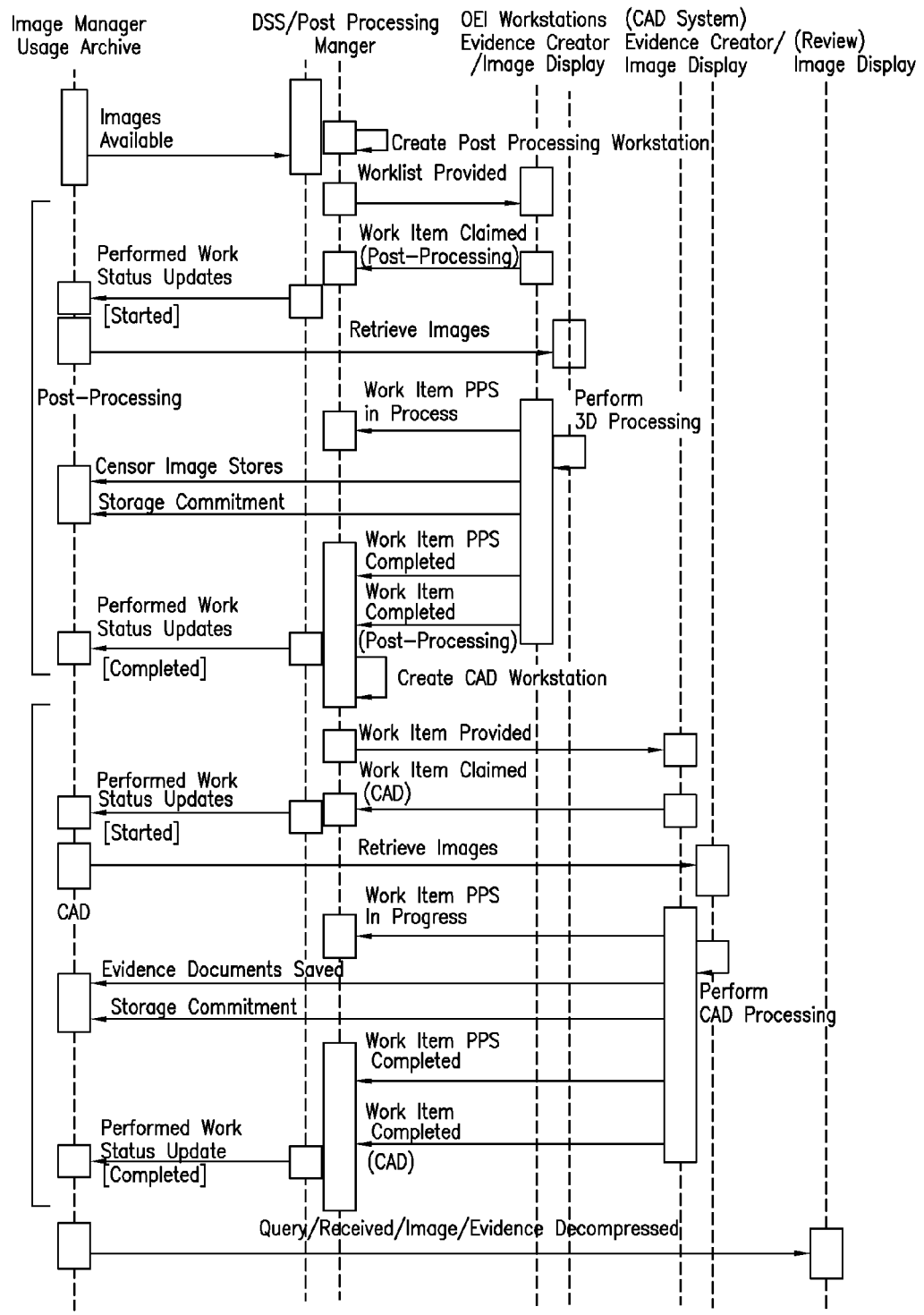
FIG. 2 illustrates a workflow sequence.

FIG. 1 illustrates use of workflow-locked loops for facilitating adaptation of network resources in a workflow network. The system includes a goal to service translation module (100) and a plurality of parallel mission controllers ($102_1$ through $102_n$), each in communication with a software-controlled network ($104_1$ through $104_n$). The goal to service translation module (100) is operative to perform mission goal statement to policy statement translation. In particular, the goal to service translation module maps a workflow mission and its components to a machine-friendly workflow representation, as described in co-pending U.S. patent application Ser. No. 11/469,416, entitled MISSION GOAL STATEMENT TO POLICY STATEMENT TRANSLATION, by Franco Travostino, Bruce Schoefield, and Inder Monga, filed contemporaneously with this application, which is incorporated by reference. The output of the goal to service translation module (100) is provided to the controllers ($102_1$ through $102_n$). The controllers are operative to set up and dynamically reallocate network resources based on the policy statements provided by the goal to service translation module and feedback from the software-controlled networks ($104_1$ through $104_n$). Each controller is responsible for a particular workflow mission, or portion thereof, resulting in a workflow sequence such as that illustrated by FIG. 2. The software-controlled networks are comprised of various network resources which can be manipulated by the controller to accommodate a workflow sequence.

A first, upper workflow-locked loop (106) is operative to handle mission level exceptions. The controllers (102) communicate with one another in order to coordinate responses to changing conditions. For example, during the planning stage a new or modified mission goal statement may be provided to the goal to service translation module. Similarly, after a mission has commenced there may be need to update the mission goal statement, e.g., a recognition that the number of anticipated targets or value of the targets is significantly different than originally anticipated. In response to a new mission goal statement (110), the goal to service translation module (100) produces an updated policy statement or statements (112). The updated policy statement may be pushed to the controllers, or provided in response to request. Since the updated policy statement may not directly affect all of the missions or portions thereof, the updated policy statement may also be selectively transmitted to only those controllers that are directly affected, or controllers that are not directly affected may take no initial response to the updated policy statement. In the case where the updated policy statement is provided in response to request, the loop is workflow-locked because only those portions of the updated policy statement which affect a particular workflow are requested and provided.

In another scenario, the subset of controllers that are affected by policy statement update may determine that their software-controlled network is unable to be dynamically updated in a manner which enables compliance with the updated policy statement. In that case, the subset of controllers broadcast an indication of the resource difficulty to the other controllers to prompt a tender bid process as described in U.S. patent application Ser. No. 11/469,404, entitled TIME-VALUE CURVES TO PROVIDE DYNAMIC QOS FOR TIME SENSITIVE FILE TRANSFERS, by Franco Travostino, Bruce Schoefield, and Inder Monga, filed contemporaneously with this application, which is incorporated by reference. The goal to service translation module may be employed to arbitrate the tender bid process by issuing further updated policy statements, e.g., to reallocate resources from one controller to another based on priority. The first workflow-locked loop (106) is comprised of the communications between at least one of the coordinated controllers and the goal to service translation module that facilitate dynamic reallocation of network resources based on mission level exceptions, accomplished by updating the policy statement in response to information from the controllers.

A series of second, lower workflow-locked loops ($108_1$ through $108_n$), one for each mission or mission segment, is employed to dynamically adapt to changes in the field. The lower loops (108) deal with network level exceptions such as faults, fades, and changing conditions, as well as mission-related data feedback to the controller, e.g., location information, to adjust network priority, policies, and network resource allocation to meet changing conditions while meeting mission goals. Each controller prompts its software-controlled network to provide information regarding changing network conditions related to the workflow being supported. For example, network congestion and outright failures of links and nodes that upset the workflow of the software-controlled network are reported back to the controller via the workflow-locked loop. Similarly, an unexpectedly large or small number or frequency of targets may be reported. The software-controlled network may also report what remedial actions will be taken, if any. Some aspects of the software-controlled network may be protected by backup resources in the network itself, e.g., protection switching, protection links, backup cards. The controller is operative to filter the reports from the software-controlled network such that problems that will not have a deleterious affect on the mission relative to a predetermined threshold, e.g., in units of time or dropped data. The remaining reports of changes in the software-controlled network are reported from the controller to the goal to service translation module so that the policy statements may be updated. For example, a loss of resources dedicated to a relatively high value mission in one software-controlled network can be lead to an updated policy statement that causes reallocation of resources from a relatively lower value mission in another software-controlled network.

In view of the description above it will be appreciated by those skilled in the art that the inventive concept generally provides a closed loop system for enhanced adaptive network capabilities in support of workflow missions, including a coordinated approach that reallocates resources between missions. It should also be appreciated that the different workflow-locked loops may have different sample rates and response times. In one embodiment the second, lower workflow-locked loops have a slower sample rate than an anticipated network element response to faults.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. An apparatus for facilitating adaptation of at least one software-controllable communications network comprising:
    a translation module, the translation module operative to translate at least one mission goal statement to a policy statement;
    a controller, the controller operative in response to the policy statement to configure the software-controllable network;
    a first workflow-locked loop between the translation module and the controller, the first workflow-locked loop processing mission level exceptions based on information from the controller, the first workflow-locked loop responsive to the mission level exceptions to change at least one policy statement; and
    a second workflow-locked loop between the controller and the software-controllable network, the second workflow-locked loop gathering data from the field and processing network level exceptions based on the data gathered from the field, the second workflow-locked loop responsive to the network level exceptions to cause the controller to reconfigure the software-controllable network.

2. The apparatus of claim 1 wherein the first workflow-locked loop has a response time which differs from that of the second workflow-locked loop.

3. The apparatus of claim 2 wherein the first workflow-locked loop has a response time which is slower than that of the second workflow-locked loop.

4. The apparatus of claim 1 wherein there are a plurality of missions, and for each mission there is a controller that configures the software-controllable network to support a workflow defined for that mission.

5. The apparatus of claim 4 wherein each controller is operative to prompt its software-controllable network to provide information regarding network level exceptions.

6. The apparatus of claim 5 wherein each controller is operative to filter from the information those exceptions which will be adequately remedied by the software-controllable network.

7. The apparatus of claim 6 wherein an indication of the remaining information is provided to other controllers.

8. The apparatus of claim 6 wherein an indication of the remaining information is provided to the translation module.

9. A method for facilitating adaptation of at least one software-controllable communications network, the method comprising the steps of:
    translating, with a translation module, at least one mission goal statement to a policy statement;

in response to the policy statement, configuring the software-controllable network with a controller;

processing mission level exceptions via a first workflow-locked loop between the translation module and the controller to change at least one policy statement; and processing network level exceptions and gathering data from the field via a second workflow-locked loop between the controller and the software-controllable network, the network level exceptions to cause the controller to reconfigure the software-controllable network.

10. The method of claim 9 including the further step of configuring the first workflow-locked loop with a response time which differs from that of the second workflow-locked loop.

11. The method of claim 9 including the further step of configuring the first workflow-locked loop with a response time which is slower than that of the second workflow-locked loop.

12. The method of claim 9 wherein there are a plurality of missions, and including the further step of assigning a controller to each mission to configure the software-controllable network to support a workflow defined for that mission.

13. The method of claim 12 including the further step of prompting, with each controller, its respective software-controllable network to provide information regarding network level exceptions.

14. The method of claim 13 including the further step of each controller filtering from the information those exceptions which will be adequately remedied by the software-controllable network.

15. The method of claim 14 including the further step of providing an indication of the remaining information to other controllers.

16. The method of claim 14 including the further step of providing an indication of the remaining information to the translation module.

* * * * *